Figure 1:
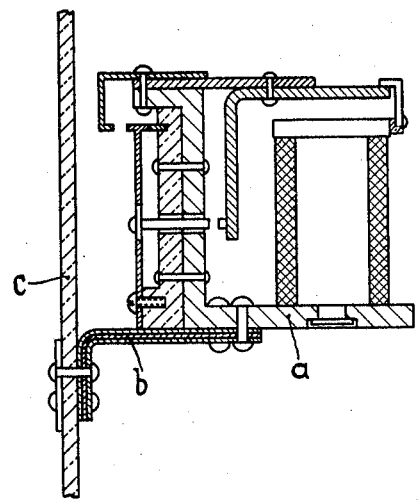
Figure 2:
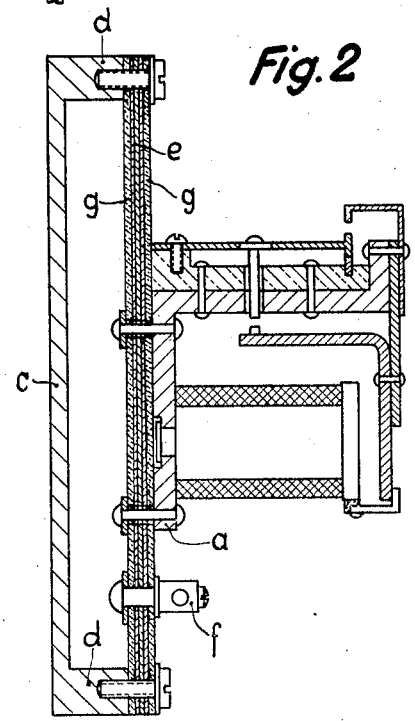

Oct. 17, 1933. O. GAUSS ET AL 1,931,188
ELECTROMAGNETIC RELAY
Filed Nov. 30, 1931

Patented Oct. 17, 1933

1,931,188

UNITED STATES PATENT OFFICE

1,931,188

ELECTROMAGNETIC RELAY

Oskar Gauss and Richard Kurz, Stuttgart, Germany, assignors to Robert Bosch Aktiengesellschaft, Stuttgart, Germany Application November 30, 1931, Serial No. 578,116, and in Germany December 8, 1930

4 Claims. (Cl. 175—336)

This invention relates to improvements in the mounting of cut-outs or regulators for the dynamo circuit of electric lighting circuits suitable for automobile and the like vehicles.

In dynamos for motor vehicles the electromagnetic voltage regulators are often mounted on the casing of the dynamo. On account of their rigid fastening they are then subjected to all shocks and vibrations of the engine from which the drive is transmitted. Due to such shock, the oscillation of the regulator armature may be so increased that the latter no longer controls the regulator contacts in the intended manner, and does not regulate the voltage of the dynamo in the desired manner. In order to overcome this disadvantage, according to the invention the regulator is hung on a leaf-spring, and preferably laminated springs are used.

In the drawing two methods of carrying out the invention are shown.

In the first example (Fig. 1) the base-plate $a$ of the voltage regulator is riveted to the one limb of a leaf spring bundle $b$ bent at right angles, the other limb of which is fastened to a supporting plate $c$. This is fitted in suitable manner, for example to the bearing bracket of the dynamo to be regulated. The vibrations of the dynamo are so damped by the leaf spring bundle $b$ that they no longer seriously affect the regulator. Also the regulator can swing out freely after each shock by reason of its spring mounting. The correct working of the regulator is therefore no longer disturbed by shocks, and the dependability of the regulator is increased.

In the second example of construction, the supporting plate $c$, connected with the bearing bracket of the dynamo, has lugs $d$ to which a holder consisting of a leaf spring bundle $e$ is fastened. To the holder are riveted the base-plate $a$ of the regulator and the terminals $f$. To insulate the regulator insulating washers $g$ are provided on either side of the leaf-spring bundle $e$.

If desired, the leaf-spring bundles $b$ and $e$ may be replaced by a single leaf-spring of suitable material. The leaf-spring bundles have the advantage that for equal flexibility their rigidity is greater.

Even when the regulator is mounted as a unit apart from the dynamo, for example, to the dashboard of the vehicle, it is subject to oscillation, shock and vibration during the travel of the vehicle. For this reason the resilient suspension of the regulator is advantageous, even if the regulator is not secured to the dynamo but in another place.

We declare, that what we claim is:

1. As an article of manufacture an electromagnetic relay and a supporting bracket attached thereto having a free terminal extending beyond the boundary walls of said relay and formed for rigid attachment of said terminal to a foundation support, said bracket being formed of a leaf spring adapted to alone resiliently support said relay upon said supporting foundation.

2. As an article of manufacture an electromagnetic controlling device for dynamos on vehicles and a supporting bracket attached thereto having a free terminal extending beyond the boundary walls of said controlling device and formed for rigid attachment of said terminal to a foundation support, said bracket being formed of a bundle of leaf springs adapted to alone resiliently support said controlling device upon said supporting foundation.

3. As an article of manufacture an electromagnetic relay having a base plate and a supporting bracket formed of a bundle of leaf springs attached to said base plate and having opposite perforated terminals extending beyond said base plate and a pair of insulating washers clamping the sides of said leaf springs therebetween.

4. A mounting for an electro-magnetic controlling device comprising the combination, with said device, of an angle-shaped leaf spring having one arm rigidly secured to an outer face of said device and the other arm spaced from said device, a rigid supporting element and means rigidly mounting said other arm on said supporting element whereby said controlling device is resiliently mounted on said supporting element solely by said spring.

OSKAR GAUSS.
RICHARD KURZ.